United States Patent
Stahl et al.

(10) Patent No.: US 8,393,215 B2
(45) Date of Patent: Mar. 12, 2013

(54) MICROMECHANICAL ACCELERATION SENSOR HAVING AN OPEN SEISMIC MASS

(75) Inventors: Heiko Stahl, Reutlingen (DE); Dietrich Schubert, Reutlingen (DE); Lars Tebje, Reutlingen (DE)

(73) Assignee: Robert Bosch GmbH, Stuttgart (DE)

( * ) Notice: Subject to any disclaimer, the term of this patent is extended or adjusted under 35 U.S.C. 154(b) by 386 days.

(21) Appl. No.: 12/468,501

(22) Filed: May 19, 2009

(65) Prior Publication Data
US 2009/0314085 A1 Dec. 24, 2009

(30) Foreign Application Priority Data
Jun. 24, 2008 (DE) .......................... 10 2008 002 606

(51) Int. Cl.
*G01P 15/125* (2006.01)
(52) U.S. Cl. ................ 73/514.32; 73/514.29; 73/514.38
(58) Field of Classification Search .............. 73/514.16, 73/514.21, 514.22, 514.23, 514.24, 514.29, 73/514.32, 514.36, 514.38
See application file for complete search history.

(56) References Cited

U.S. PATENT DOCUMENTS

| | | | |
|---|---|---|---|
| 5,025,346 A | 6/1991 | Tang et al. | |
| 6,272,926 B1 * | 8/2001 | Fehrenbach et al. | 73/514.32 |
| 6,360,605 B1 * | 3/2002 | Pinter et al. | 73/514.38 |
| 6,634,232 B1 * | 10/2003 | Rettig et al. | 73/514.15 |
| 2007/0062261 A1 | 3/2007 | DeNatale et al. | |
| 2009/0282914 A1 * | 11/2009 | Rehle | 73/504.12 |
| 2009/0320596 A1 * | 12/2009 | Classen et al. | 73/514.32 |

FOREIGN PATENT DOCUMENTS

| | | |
|---|---|---|
| DE | 196 39 946 | 4/1998 |
| DE | 60 311 281 | 11/2007 |
| EP | 1 626 283 | 2/2006 |
| WO | WO2004010150 | 1/2004 |

* cited by examiner

*Primary Examiner* — Eric S McCall
(74) *Attorney, Agent, or Firm* — Kenyon & Kenyon LLP

(57) ABSTRACT

A micromechanical acceleration sensor having a substrate, a suspension, a seismic mass, and stationary capacitive electrodes, in which the seismic mass is suspended over the substrate with the help of the suspension, the seismic mass has a mass center of gravity, the suspension has at least two anchors on the substrate, the two anchors are situated on opposite sides of the mass center of gravity, the distance between the two anchors being small compared to a horizontal extension of the seismic mass, the two anchors determine a central axis, the seismic mass have recesses which are situated on opposite sides of the central axis and are laterally open outward on the sides facing away from the central axis, and the stationary electrodes at least engage in the recesses of the seismic mass.

11 Claims, 2 Drawing Sheets

MICROMECHANICAL ACCELERATION SENSOR HAVING AN OPEN SEISMIC MASS

RELATED APPLICATION INFORMATION

The present application claims priority to and the benefit of German patent application no. 102008002606.9-52, which was filed in Germany on Jun. 24, 2008, the disclosure of which is incorporated herein by reference.

FIELD OF THE INVENTION

The present invention is directed to a micromechanical acceleration sensor having a substrate, a suspension, a seismic mass, and stationary capacitive electrodes.

BACKGROUND INFORMATION

Other micromechanical acceleration sensors are discussed in European Patent Application EP 1626283 A1 and in the translation of European Patent DE 60311281 T2.

A basic principle of acceleration sensors is that a seismic mass is installed with the aid of a suspension on a substrate, movably with respect to stationary electrodes. Mechanical stresses between the substrate and the suspension or the seismic mass may be caused by different thermal expansion coefficients and/or warping between the substrate, the stationary electrodes, and the seismic mass having the movable electrodes. The mechanical and electrical properties of the acceleration sensor may be affected thereby.

SUMMARY OF THE INVENTION

In Patent Application DE 102008001863 (which is not a prior publication), the stationary electrodes are surrounded by the seismic mass.

One aspect of the exemplary embodiments and/or exemplary methods of the present invention is to provide an acceleration sensor which is insensitive to mechanical warping and different thermal expansion coefficients of the different materials.

This is achieved by anchoring the seismic mass to the substrate near the mass center of gravity of the seismic mass and by situating the movable electrodes on an outside of the seismic mass. In this way, a stable structure of the seismic mass is made possible, which is insensitive to warping.

In a refinement, the seismic mass has two parallel bars, which are connected to each other via a ground bar, the ground bar being guided through the mass center of the seismic mass.

One advantageous embodiment of the present invention provides that the seismic mass has two comb structures, which represent the movable electrodes, and are associated with the stationary electrodes.

In another specific embodiment, the suspension is designed in the form of connecting beams, which are situated along the central axis and are each connected to the seismic mass via a spring element. In this way, on the one hand, a central anchoring of the seismic mass near the mass center of gravity of the seismic mass is made possible and, in addition, an elastic mounting at a relatively great distance from the mass center of gravity is provided. The mechanical and electrical properties of the acceleration sensor are improved thereby.

In a refinement, the suspension has an S-shaped or U-shaped or folded spring element. In particular, each connecting beam may have two U-shaped spring elements situated symmetrically to the central axis. An elastic movement of the seismic mass in a reduced space is thus made possible.

In another embodiment, the two bars of the seismic mass situated parallel to the central axis are each connected to each other in an end zone via an additional ground bar. In this way, a torsionally rigid structure is provided. The additional ground bar may be designed, for example, in the form of an angular, open ring element. The additional ground bar advantageously includes the respective spring element. A compact structure is provided in this way.

In another embodiment, the stationary electrodes are connected to the substrate near the central axis, in particular near the mass center of gravity of the seismic mass. The individual stationary electrodes may be connected to the substrate, for example, via an anchor.

In another embodiment, a plurality of stationary electrodes is connected to a third and fourth additional connecting beam, which is situated in the lateral edge area outside the seismic mass. The third and fourth additional connecting beam is running in the direction of the central axis via a first and second additional connecting beam, respectively, the first and second additional connecting beams being connected to the substrate in the area of one end, which is situated opposite the third and fourth additional connecting beams and close to the central axis. In this way, a central attachment of a plurality of stationary electrodes near the mass center of gravity becomes possible.

In another embodiment, the seismic mass surrounds the suspension of the seismic mass.

DETAILED DESCRIPTION

Figure 1:
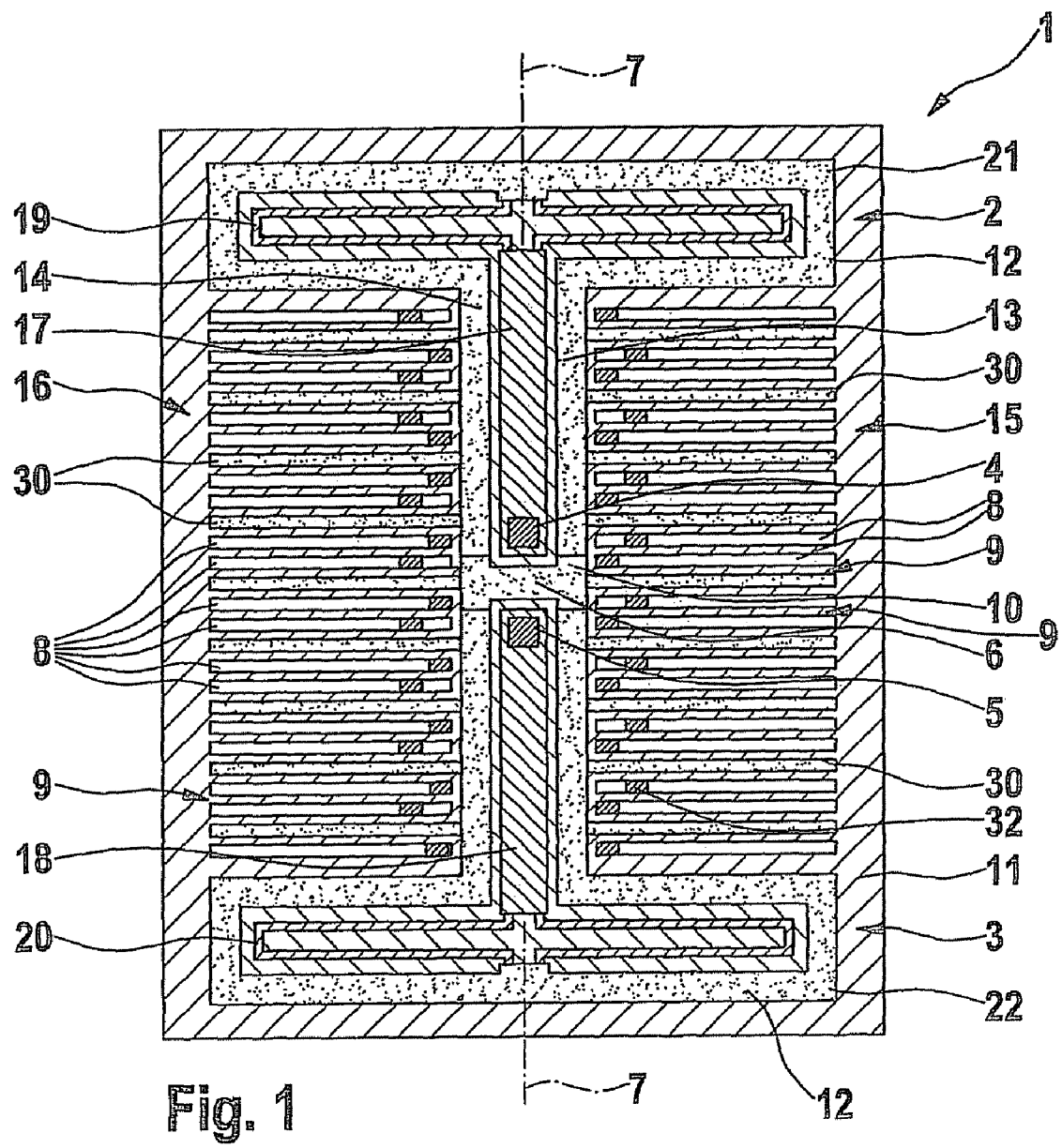
FIG. 1 shows a first exemplary embodiment of an acceleration sensor.

FIG. 1 shows an acceleration sensor 1, which has a substrate 11, a seismic mass 12, and a suspension 2, 3. The suspensions have an anchor, an additional connecting beam, and a spring element. Seismic mass 12 has a mass center of gravity 6. Seismic mass 12 has essentially two parallel bars 13, 14, which are situated parallel to a central axis 7. The two bars 13, 14 are connected to each other via a ground bar 10, ground bar 10 being essentially perpendicular to central axis 7 and passes through mass center of gravity 6. The bars and the ground bar may be made of the same material in one piece. Depending on the selected specific embodiment, ground bar 10 may also be omitted. The ends of each bar 13, 14 are connected to each other via additional ground bars 21, 22. The additional ground bars 21, 22 are designed as a rectangular open ring structure in this exemplary embodiment. The additional first and second ground bars 21, 22 have a mirror-symmetrical design with respect to central axis 7. In this way, a mechanically stable seismic mass is achieved having a large proportion of its mass at a relatively great distance from an anchor 4, 5 of the seismic mass to substrate 11.

Two anchors 4, 5 are provided, which connect substrate 11 to a first and second connecting beam 17, 18, respectively, anchors 4, 5 being situated symmetrically on opposite sides with respect to mass center of gravity 6 and along central axis 7. The distances between anchors 4, 5 and mass center of gravity 6 are small compared to an extension of the seismic mass along central axis 7. In particular, the distances are less than 20%, in particular less than 10% of the length of the seismic mass along central axis 7. Connecting beams 17, 18 are situated along central axis 7 and extend to the end area of bars 13, 14. At the ends of each connecting beam 17, 18 which face away from anchors 4, 5, a spring element 19, 20 is formed, which connects the additional first and second ground bar 21, 22 to first and second connecting beam 17, 18, respectively. In the illustrated specific embodiment of spring elements 19, 20, the ends of connecting beams 17, 18 are connected, via spring elements 19, 20, to a connection point of the additional first and second ground bar 21, 22, respectively, which are situated along central axis 7 and opposite to the ends of connecting beams 17, 18. In the illustrated specific embodiment, spring elements 19, 20 are designed in the form of two U-shaped springs, the long legs of the U-shape being situated parallel to each other and perpendicular to central axis 7. The short legs are situated on the outsides facing away from central axis 7.

In the illustrated exemplary embodiment, each spring element 19, 20 has two springs. However, each spring element may also have only one spring. In addition, the one or two springs may have an S-shaped design, U-shaped design or be shaped as a folded spring.

First and second connecting beams 17, 18 may be situated in the same plane as seismic mass 12, in particular bars 13, 14 and ground bar 10. In addition, spring elements 19, 20 may be situated in the same plane as seismic mass 12, in particular the same plane as the other ground bars 21, 22.

Seismic mass 12 has recesses 9, which are designed in the shape of longitudinal slots and are open laterally in the outer edge area. Recesses 9 are delimited by teeth 30 of seismic mass 12. In the illustrated specific embodiment, two comb structures 15, 16 are formed in the shape of teeth 30 of seismic mass 12 on opposite sides with respect to central axis 7. Each of teeth 30 is connected to first or second bar 13, 14 and represents a movable electrode. At least one stationary electrode 8 is situated in each recess 9 of comb structures 15, 16.

In the illustrated exemplary embodiment, one stationary electrode 8 is situated on opposite sides of each tooth 30. Stationary electrodes 8 are designed in the form of bars, which are situated parallel to teeth 30 and thus perpendicular to central axis 7. Stationary electrodes 8 are connected to substrate 11 with the help of additional anchoring points 32, additional anchoring points 32 being situated in end areas of the bars which are formed near the first or second bar 13, 14. In this way, attachment of stationary electrodes 8 near central axis 7 and thus near mass center of gravity 6 is achieved.

Seismic mass 12, teeth 30 and stationary electrodes 8 may be perforated, i.e., have a regular arrangement of through holes. The perforation makes it possible for an etching medium to penetrate to a sacrificial layer thereunder during an etching process when the acceleration sensor is manufactured, so that seismic mass 12 and the movable capacitive electrodes are reliably separated from substrate 11. The stationary electrodes may also be perforated.

Acceleration sensor 1 may be manufactured, for example, of semiconductor materials, metals, and/or plastic. In the illustrated exemplary embodiment, each stationary electrode 8 is associated with a movable electrode, which is represented by a tooth 30, on two opposite longitudinal sides. Movable electrode 30 and stationary electrode 8 together form a differential capacitor. When movable electrode 30 is deflected, the capacitance increases on one side and decreases on the other side of the particular electrode pair, which is formed by movable electrode 30 and the associated stationary electrode 8. The change in capacitance is a measure for the acting acceleration. Stationary electrodes 8 may be connected via four networks of track conductors, one network being provided for the first stationary electrodes and another network for the second stationary electrodes of the movable electrodes of first comb structure 15 and, similarly, two networks of track conductors being provided for the stationary electrodes of second comb structure 16. The electrical connections are connected to substrate 11 via the mechanical anchors.

In the illustrated exemplary embodiment, additional anchors 32, via which neighboring stationary electrodes are connected to substrate 11, are situated laterally offset in the direction perpendicular to central axis 7. In this way, a simpler manufacture and more room for the other anchor 32 is made possible.

Depending on the specific embodiment selected, the stationary electrodes end in the same external lateral end area as teeth 30 of comb structures 15, 16 of seismic mass 12. Additional first and second ground bars 21, 22 may define a lateral edge area in which also stationary electrodes 8 and teeth 30 end. Comb structures 15, 16 and stationary electrodes 8 are thus delimited and covered by additional first ground bar 21 and additional second ground bar 22 on opposite boundary sides, which are situated perpendicular to central axis 7. The micromechanical acceleration sensor thus has a rectangular shape, the comb structures being situated along the longitudinal sides and additional ground bars 21, 22 being situated along the narrow transverse sides.

Figure 2:
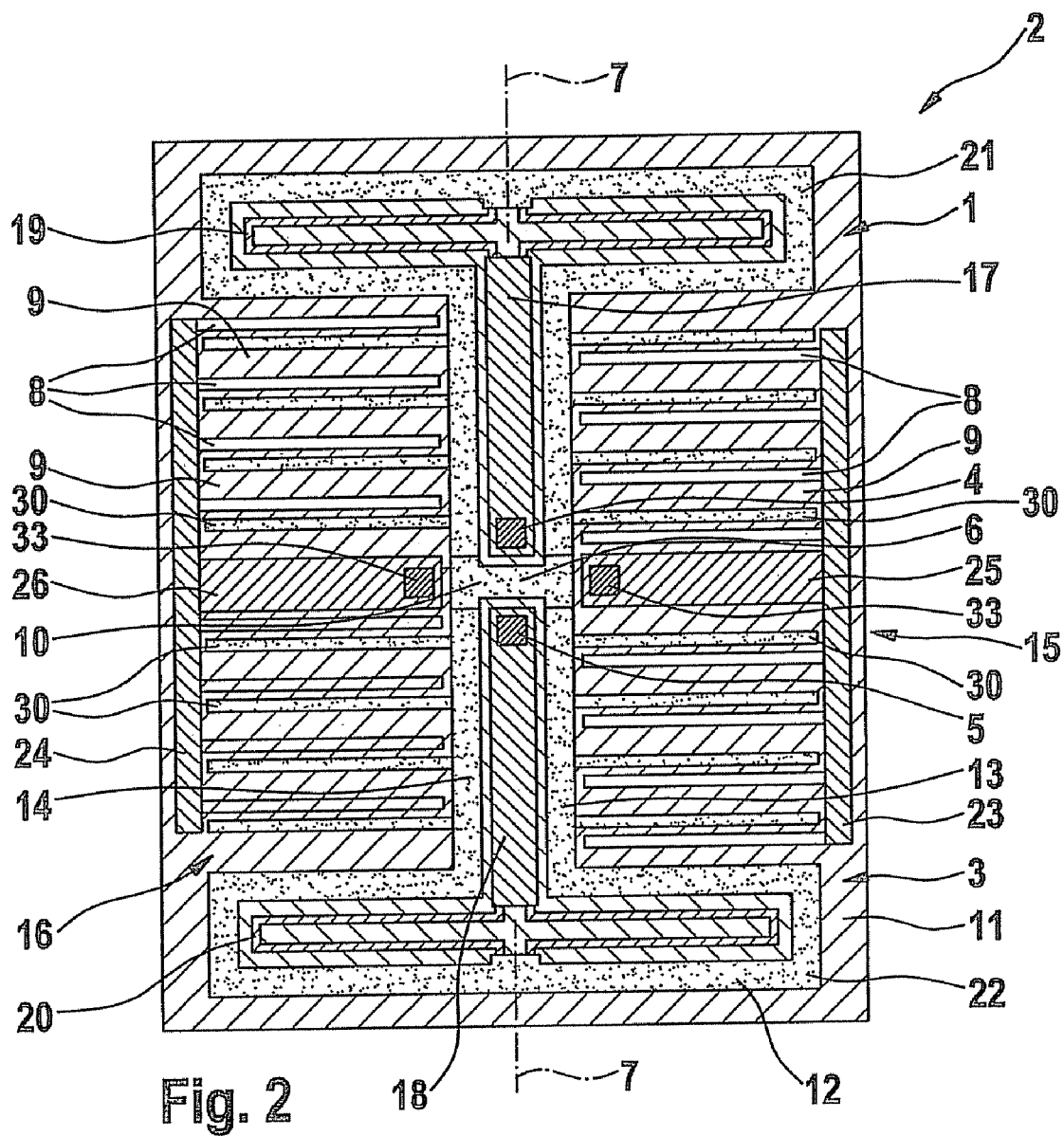
FIG. 2 shows a second specific embodiment of an acceleration sensor.

FIG. 2 shows another specific embodiment in which suspension 2, 3, seismic mass 12, and comb structures 15, 16 are designed as in the specific embodiment of FIG. 1. Depending on the specific embodiment, fewer teeth 30 may be provided for the two comb structures 15, 16 or at least one recess may be provided in the comb structures in the area of ground bar 10.

The design of stationary electrodes 8 is different from that in the specific embodiment of FIG. 1. Stationary electrodes 8 of a comb structure 15, 16 extend to the outside of an edge area of the seismic mass and thus of the comb structure of movable electrodes 30. Next to comb structure 15, 16 of movable electrodes 30 a third and fourth additional connecting beam 23, 24 is provided, which is situated parallel to central axis 7. Each stationary electrode 8 of a comb structure is connected to third or fourth additional connecting beam 23, 24. Third and fourth additional connecting beam 23, 24 is connected to a first and second additional connecting beam 25, 26, respectively, which protrudes into the particular comb structure and extends toward ground bar 10. In one specific embodiment, first and second additional connecting beam 25, 26 is situated on the same axis as ground bar 10. Next to ground bar 10, first and second additional connecting beam 25, 26 is each connected to substrate 11 via additional connecting point 33. In this way, two additional comb structures of stationary electrodes are provided, which are connected to substrate 11 near mass center 6 of seismic mass 12.

In this specific embodiment, only one stationary electrode 8 is associated with one movable electrode 30, so that one movable electrode and one stationary electrode form one electrode pair and thus initially one simple capacitor. In first comb structure 15 of movable electrodes 30, each stationary electrode is situated above the corresponding movable electrode 30 with respect to central axis 7. In second comb structure 16, each stationary electrode 8 is situated below the corresponding movable electrode 30 with respect to central axis 7. A differential capacitor is formed by determining the differential capacitance between the two comb structures 15, 16. When movable electrodes 30 are deflected, the capacitance increases on one comb structure and decreases on the opposite comb structure. The change in capacitance is a measure for the acting acceleration.

The stationary electrodes are connected via two networks of track conductors, one network being provided for the first stationary electrode on the first comb structure and another network being provided for the second stationary electrode on the opposite second comb structure. The electrical connections are represented by the mechanical anchors. Improved zero-point stability is achieved by anchoring the stationary electrodes near mass center of gravity 6 of seismic mass 12.

In the specific embodiment of FIG. 1, a high quiescent capacitance is achieved on a small surface area with moderate zero-point stability. In the specific embodiment of FIG. 2, a zero-point stability improved by a factor 2 is achieved. For a quiescent capacitance comparable with the exemplary embodiment of FIG. 1, however, the surface occupied by electrodes or the electrode height must be increased by a factor 2.

Also in the specific embodiment of FIG. 2, stationary electrodes 8 are situated at the same height as movable electrodes 30. Stationary electrodes 8 and first and second additional connecting beams 25, 26 may be made of different materials. In particular, third and fourth additional connecting beams 23, 24 may be made of the same material as first and second additional connecting beams 25, 26.

What is claimed is:

1. A micromechanical acceleration sensor, comprising:
   a substrate;
   a suspension attached to the substrate by at least two anchors, wherein the two anchors determine a central axis;
   a seismic mass, wherein the seismic mass is suspended over the substrate with the aid of the suspension, and wherein the seismic mass has a mass center of gravity; and
   stationary capacitive electrodes;
   wherein the two anchors are situated on opposite sides of the mass center of gravity, a distance between the two anchors being less than an overall horizontal extension of the seismic mass along the central axis,
   wherein the seismic mass has recesses which are situated on opposite sides of the central axis and which are laterally open outward on sides facing away from the central axis, and
   wherein the stationary electrodes at least engage in the recesses of the seismic mass.

2. The acceleration sensor of claim 1, wherein a connecting beam, which is situated along the central axis, is formed with each anchor, a spring element connected to the seismic mass and being situated on the connecting beams on sections situated opposite the anchors.

3. The acceleration sensor of claim 1, wherein the suspension has one of an S-shaped spring element, a U-shaped spring element, and a folded spring element.

4. The acceleration sensor of claim 1, wherein the seismic mass surrounds the suspension.

5. The acceleration sensor of claim 1, wherein the stationary electrodes are attached to the substrate in the area near the central axis.

6. The acceleration sensor of claim 5, wherein the stationary electrodes are in the shape of individual bars, the bars being attached to the substrate in end areas which are associated with the central axis.

7. The acceleration sensor of claim 1, wherein the seismic mass has two bars on opposite sides of the central axis, and wherein one comb structure has recesses formed on each of the two bars.

8. The acceleration sensor of claim 7, wherein the seismic mass has a ground bar, which passes through the mass center of gravity and is situated between the two anchors, the ground bar connecting the two bars.

9. The acceleration sensor of claim 8, wherein the two bars are connected to each other at the ends via a first and second additional ground bar.

10. The acceleration sensor of claim 9, wherein the first and second additional ground bars surround the respective spring elements.

11. A micromechanical acceleration sensor, comprising:
    a substrate;
    a suspension having at least two anchors on the substrate, wherein the two anchors determine a central axis;
    a seismic mass, wherein the seismic mass is suspended over the substrate with the aid of the suspension, and wherein the seismic mass has a mass center of gravity; and
    stationary capacitive electrodes;
    wherein the two anchors are situated on opposite sides of the mass center of gravity, a distance between the two anchors being small compared to a horizontal extension of the seismic mass along the central axis,
    wherein the seismic mass has recesses which are situated on opposite sides of the central axis and which are laterally open outward on sides facing away from the central axis,
    wherein the stationary electrodes at least engage in the recesses of the seismic mass,
    wherein the stationary electrodes are attached to the substrate in the area near the central axis, and
    wherein the stationary electrodes are connected on both sides to a third and fourth additional connecting beam, which are oriented parallel to the central axis and are situated in the lateral edge area of the seismic mass, the third and fourth additional connecting beams running in a direction of the central axis in a recess of the seismic mass via a first and second additional connecting beam, the first and second additional connecting beam being connected to the substrate in an area of one end associated with the central axis.

\* \* \* \* \*